United States Patent
Zhao et al.

(10) Patent No.: US 10,419,355 B2
(45) Date of Patent: Sep. 17, 2019

(54) FLOW CONTROL OF NETWORK DEVICE

(71) Applicant: HEWLETT PACKARD ENTERPRISE DEVELOPMENT LP, Houston, TX (US)

(72) Inventors: Zhiyu Zhao, Beijing (CN); Ze Zhang, Beijing (CN); Changlin Mu, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/551,363

(22) PCT Filed: Feb. 5, 2016

(86) PCT No.: PCT/CN2016/073609
§ 371 (c)(1),
(2) Date: Aug. 16, 2017

(87) PCT Pub. No.: WO2016/131397
PCT Pub. Date: Aug. 25, 2016

(65) Prior Publication Data
US 2018/0048582 A1   Feb. 15, 2018

(30) Foreign Application Priority Data
Feb. 16, 2015   (CN) .......................... 2015 1 0085671

(51) Int. Cl.
*H04L 12/835* (2013.01)
*H04L 12/801* (2013.01)
*H04L 12/851* (2013.01)

(52) U.S. Cl.
CPC .............. *H04L 47/30* (2013.01); *H04L 47/24* (2013.01); *H04L 47/29* (2013.01)

(58) Field of Classification Search
CPC .......... H04L 47/30; H04L 47/24; H04L 47/29
(Continued)

(56) References Cited

U.S. PATENT DOCUMENTS

2008/0253289 A1* 10/2008 Naven ..................... H04L 47/10
370/236
2012/0005300 A1* 1/2012 Muppalla ................ G06F 13/24
709/212

(Continued)

FOREIGN PATENT DOCUMENTS

CN    1494003 A    5/2004
CN    101030926 A   9/2007

(Continued)

OTHER PUBLICATIONS

International Search Report and Written Opinion, International Application No. PCT/CN2016/073609, dated May 11, 2016, pp. 1-6, SIPO.

(Continued)

*Primary Examiner* — Yemane Mesfin
*Assistant Examiner* — Intekhaab A Siddiquee

(57) ABSTRACT

In an example, a logic apparatus of an interface board in a network device may generate an Ethernet flow control packet including sending completion information according to Ethernet data packets sent from a sending buffering queue maintained in the interface board. The logic apparatus of the interface board may transmit the Ethernet flow control packet including sending completion information to an Ethernet data channel by taking priority over Ethernet data packets in a receiving buffering queue in an ingress direction. The sending completion information is used by a CPU of a mainboard to maintain a state of the sending buffering queue.

20 Claims, 8 Drawing Sheets

(58) Field of Classification Search
USPC .......................................................... 370/235
See application file for complete search history.

(56) References Cited

U.S. PATENT DOCUMENTS

2012/0140626 A1* 6/2012 Anand ................ H04L 49/1515
370/235
2014/0369194 A1* 12/2014 Friedman ................ H04L 47/32
370/235
2015/0016276 A1 1/2015 Decusatis et al.

FOREIGN PATENT DOCUMENTS

| CN | 101047615 A | 10/2007 |
| CN | 101119379 A | 2/2008 |
| CN | 101188560 A | 5/2008 |
| CN | 102316085 A | 1/2012 |
| CN | 103546386 A | 1/2014 |

OTHER PUBLICATIONS

International Preliminary Report on Patentability received for PCT Patent Application No. PCT/CN2016/073609, dated Aug. 31, 2017, 5 pages.

* cited by examiner

FLOW CONTROL OF NETWORK DEVICE

BACKGROUND

Network devices may adopt Ethernet bus architecture. In the Ethernet bus architecture, the network device may include a mainboard and an interface board, a first Ethernet data channel is formed between a CPU of a mainboard and an Ethernet switch chip of the mainboard, a second Ethernet data channel is formed between the Ethernet switch chip of the mainboard and a logic apparatus of an interface board, and an interface data channel is formed between the logic apparatus of the interface board and an interface chip of the interface board. The bandwidth of the first Ethernet data channel may not match with the bandwidth of the second Ethernet data channel, and the bandwidth of the second Ethernet data channel may not match with the bandwidth of the interface data channel.

Thus, congestion of data packets may occur frequently in an egress direction. This can make it hard for the network device to accurately implement Quality of Service (QOS) in the egress direction.

DETAILED DESCRIPTION

The present disclosure will be illustrated in detail hereinafter with reference to the accompanying drawings and specific examples.

As used in the description herein and throughout the claims that follow, the meaning of "a", "an", and "the" includes both the singular and plural unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

Figure 1:
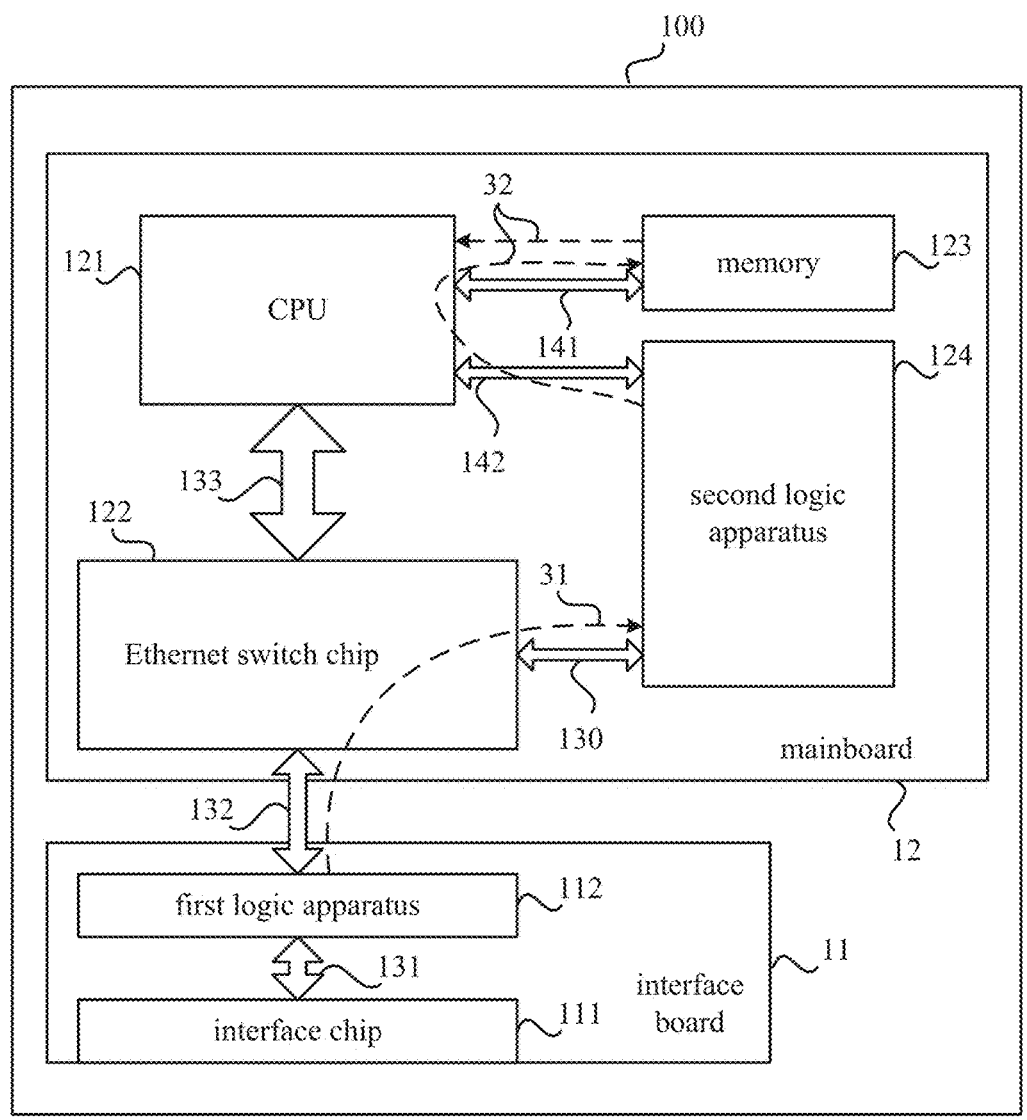
FIG. 1 is a diagram illustrating a structure of a network device according to various examples of the present disclosure.

FIG. 1 is a diagram illustrating a structure of a network device according to various examples of the present disclosure. As shown in FIG. 1, a network device 100 may adopt Ethernet bus architecture, and includes an interface board 11 and a mainboard 12. The interface board 11 includes an interface chip 111 and a first logic apparatus 112. The mainboard 12 includes a CPU 121, an Ethernet switch chip 122, a memory 123 and a second logic apparatus 124.

The interface chip 111 may provide an external interface for the network device 100 and process packets received and sent via the external interface. In some examples, the external interface may be connected to a Wide Area Network (WAN), and the external interface may be called a WAN interface. The WAN interface may be an Asymmetric Digital Subscriber Line (ADSL) interface and bus, an E1/T1 interface and bus which adopt Time Division Multiplexing (TDM) technologies, a Console interface and bus, or a Packet over SONET/SDH (POS) interface. In some examples, the interface chip 111 may be connected to the first logic apparatus 112 via an interface bus 131. The Ethernet switch chip 122 may be connected to the first logic apparatus 112 and the CPU 121 via an Ethernet bus 132 and an Ethernet bus 133 respectively.

The memory 123 may be connected to the CPU 121 via a memory bus 141.

The second logic apparatus 124 may be connected to the CPU 121 via an I/O bus 142, e.g. a Peripheral Component Interconnect-Express (PCI-E) bus. The second logic apparatus 124 may be connected to the Ethernet switch chip 122 via an Ethernet bus 130. The CPU 121 may access the memory 123, and the second logic apparatus 124 may access the memory 123 via the CPU 121 by using a Direct Memory Access (DMA) mode. In the DMA mode, the CPU 121 includes a memory controller which is connected to the memory bus 141 and corresponds to the memory 123, and the CPU 121 further includes a PCI-E controller which is connected to the PCI-E bus 142 and corresponds to the second logic apparatus 124. When the second logic apparatus 124 accesses the memory 123 by using the DMA mode, the PCI-E controller may transfer access commands to the memory controller, so that the memory 123 is accessed directly.

In an egress direction of the network device 100, Ethernet data packets sent by the CPU 121 may be transmitted to the first logic apparatus 112 through the Ethernet bus 133, the Ethernet switch chip 122, and the Ethernet bus 132 respectively.

In an ingress direction of the network device 100, Ethernet data packets sent by the first logic apparatus 112 may be transmitted to the CPU 121 through the Ethernet bus 132, the Ethernet switch chip 122, and the Ethernet bus 133 respectively.

The Ethernet bus 132 between the first logic apparatus 112 and the Ethernet switch chip 122 and the Ethernet bus 133 between the CPU 121 and the Ethernet switch chip 122 may be used to transmit Ethernet data packets. Thus, the Ethernet buses 132 and 133 may be regarded as Ethernet data channels, and it may be regarded that an Ethernet data channel is formed between the first logic apparatus 112 and the CPU 121 through the Ethernet switch chip 122. In some examples, the Ethernet data channel may be used by multiple interface boards, multiple logic channels may be generated by the interface boards logically, and the Ethernet data channel may be used by the multiple logic channels.

Figure 2:
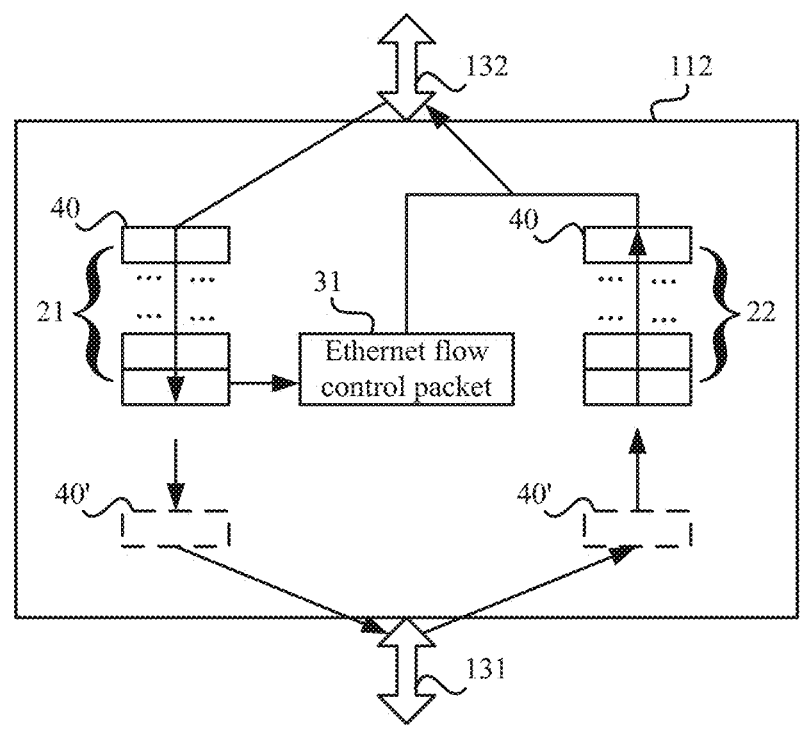
FIG. 2 is a diagram illustrating a first logic apparatus according to various examples of the present disclosure.

Referring to FIGS. 1 and 2, the first logic apparatus 112 may maintain a sending buffering queue 21 in the egress direction and a receiving buffering queue 22 in the ingress direction.

In the egress direction, an Ethernet data packet 40 received from the CPU 121 is buffered in the sending buffering queue 21. After the Ethernet data packet 40 buffered in the sending buffering queue 21 is transformed into an external interface packet 40', the external interface packet 40' is sent to the interface chip 111 via the interface bus 131.

In the ingress direction, an external interface packet 40' received from the interface chip 111 is transformed into an Ethernet data packet 40 and buffered in the receiving buffering queue 22, and the Ethernet data packet 40 in the receiving buffering queue 22 is sent via the Ethernet data channel, i.e. the Ethernet bus 132.

In some examples, when the interface board 11 has multiple logic channels, each logic channel corresponds to one sending buffering queue 21 and one receiving buffering queue 22.

Figure 3:
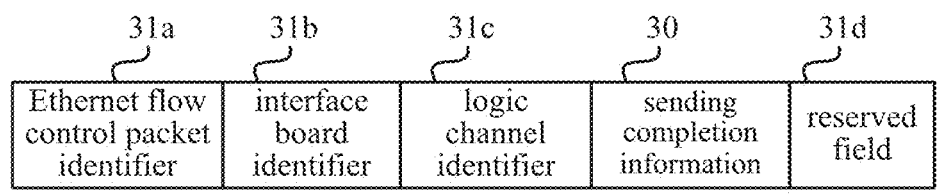
FIG. 3 is a diagram illustrating a valid data segment of an Ethernet flow control packet according to various examples of the present disclosure.

The first logic apparatus 112 may generate an Ethernet flow control packet 31 which includes sending completion information according to the Ethernet data packets 40 sent from the sending buffering queue 21, so as to the CPU 121 may determine whether the Ethernet data packets 40 congest in the egress direction according to the sending completion information. FIG. 3 is a diagram illustrating a valid data segment of an Ethernet flow control packet according to various examples of the present disclosure. As shown in FIG. 3, the Ethernet flow control packet 31 may adopt the minimum length of the Ethernet packet, i.e. 64 bits, and contents included in the Ethernet flow control packet 31 may be taken as valid data of an Ethernet packet and may be encapsulated in the Ethernet packet. The Ethernet flow control packet 31 includes an Ethernet flow control packet identifier 31a, an interface board identifier 31b, a logic channel identifier 31c, sending completion information 30 and a reserved field 31d.

The Ethernet flow control packet identifier 31a is used to indicate that the Ethernet packet is an Ethernet flow control packet.

The interface board identifier 31b is used to indicate an interface board 11 generating the Ethernet flow control packet 31.

The logic channel identifier 31c is used to indicate a logic channel corresponding to sending completion information included in the Ethernet flow control packet 31.

The sending completion information 30 is used to indicate sending status of Ethernet data packets in the egress direction of the logic channel. In some examples, the sending completion information may be the number of the Ethernet data packets sent out after last Ethernet flow control packet 31 is sent.

The reserved field 31d may be used for extending the Ethernet flow control packet 31.

In the ingress direction, the Ethernet flow control packet 31 taking priority over the Ethernet data packets in the receiving buffering queue 22 may be transmitted to the Ethernet data channel, so that the Ethernet flow control packet 31 is reported by using parts of the Ethernet data channels. In some examples, the parts of the Ethernet data channels may include the Ethernet bus 132 between the Ethernet switch chip 122 and the first logic apparatus 112, and may not include the Ethernet bus 133 between the Ethernet switch chip 122 and the CPU 121. After the Ethernet flow control packet 31 arrived at the Ethernet switch chip 122 along with the Ethernet data packets in the ingress direction, the Ethernet flow control packet 31 may be transmitted by the Ethernet switch chip 122 to the second logic apparatus 124 via the Ethernet bus 130, while the Ethernet data packets in the ingress direction are transmitted to the CPU 121 via the Ethernet bus 133.

The Ethernet switch chip 122 processes the Ethernet flow control packet 31 and the Ethernet data packets in the ingress direction in different modes. The first logic apparatus 112 may configure a higher priority for the Ethernet flow control packet 31 relative to the Ethernet data packets. According to the higher priority, in the ingress direction, the Ethernet flow control packet 31 may be transmitted to the Ethernet data channel, i.e. the Ethernet bus 132 before the Ethernet data packets in the receiving buffering queue 22 are transmitted. The Ethernet switch chip 122 processes the Ethernet flow control packet 31 and the Ethernet data packets in different modes according to different priorities. In some examples, a port of the Ethernet switch chip 122 may be configured with an Access Control List (ACL), and packets having higher priority e.g. the Ethernet flow control packet 31 may be transmitted via a port connected with the Ethernet bus 130, and packets having lower priority, e.g. the Ethernet data packet may be transmitted via a port connected with the Ethernet bus 133.

The Ethernet bus 130 may be used to transmit the Ethernet flow control packet 31 from the Ethernet switch chip 122 to the second logic apparatus 124, and the Ethernet bus 130 may be regarded as an Ethernet flow control channel. The Ethernet flow control packet 31 corresponding to any logic channel of any interface board may be transmitted via the Ethernet flow control channel. The Ethernet flow control channel may be used together by multiple interface boards and multiple logic channels divided in logic.

Figure 4:
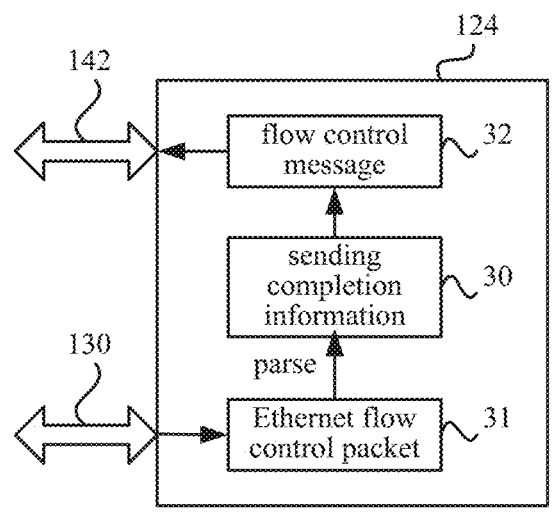
FIG. 4 is a diagram illustrating a second logic apparatus according to various examples of the present disclosure.

FIG. 4 is a diagram illustrating a second logic apparatus according to various examples of the present disclosure. As shown in FIG. 4, after receiving the Ethernet flow control packet 31 from the Ethernet switching chip 122 via the Ethernet bus 130, the second logic apparatus 124 may parse the Ethernet flow control packet 31, obtain the sending completion information 30, and generate a flow control message 32 including the sending completion information 30. The second logic apparatus 124 may write the flow control message 32 into the memory 123 by using the DMA mode.

Figure 5:
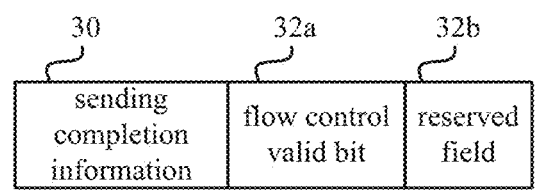
FIG. 5 is a diagram illustrating a flow control message according to various examples of the present disclosure.

FIG. 5 is a diagram illustrating a flow control message according to various examples of the present disclosure. As shown in FIG. 5, the flow control message 32 may be an I/O bus message and may include the sending completion information 30, a flow control valid bit 32a, and a reserved field 32b.

The flow control valid bit 32a may be configured as valid by the second logic apparatus 124 to indicate that the flow control message 32 is not read by the CPU 121, and may be configured as invalid by the CPU 121 after the flow control message 32 is read by the CPU 121.

The reserved field 32b may be used for extending the flow control message 32.

Figure 6:
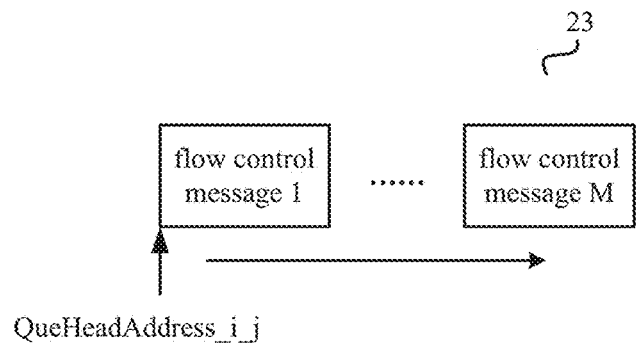
FIG. 6 is a diagram illustrating a mode for storing flow control messages in a memory according to various examples of the present disclosure.

FIG. 6 is a diagram illustrating a mode for storing flow control messages in a memory according to various examples of the present disclosure. As shown in FIG. 6, a sending completion queue 23 may be configured in the memory 123, and the second logic apparatus 124 may write the flow control message 32 into the sending completion queue 23. When there are multiple interface boards and multiple logic channels, each logic channel of each interface board may correspond to one sending completion queue 23 in the memory 123. The second logic apparatus 124 may identify the interface board and the logic channel corresponding to the flow control message 32 according to an interface identifier and a logic channel identifier parsed from the Ethernet flow control packet 31, and the second logic apparatus 124 may write the flow control message 32 into the sending completion queue 23 corresponding to the same logic channel of the same interface board. In some examples, for an interface board i and a logic channel j, i and j are both positive integer, the second logic apparatus 124 may, starting from a head address QueHeadAddress_i_j, write the flow control messages 1~M in order (M is a positive integer).

The CPU 121 may obtain the flow control message 32 by reading the memory 123. In some examples, when the CPU 121 is a single core CPU, the second logic apparatus 124 may notify the CPU 121 by using an interrupt mode, and the CPU 121 may read the flow control message 32 from the memory 123 by using an interrupt response mode. In some examples, the CPU 121 is a multiple-core CPU, the second logic apparatus 124 may not notify the CPU 121, and a designed core in the CPU 121 may read the flow control message 32 from the memory 123 by using a polling mode.

The CPU 121 may determine whether Ethernet data packets congest in the egress direction according to the sending completion information in the flow control message 32. According to the flow control message 32 and the counted number of Ethernet data packets transmitted via the Ethernet data channel, i.e. the Ethernet bus 133 in the egress direction, the CPU 121 may respond occurrence and elimination of the congestion of the Ethernet data packets in the egress direction in real time.

Figure 7:
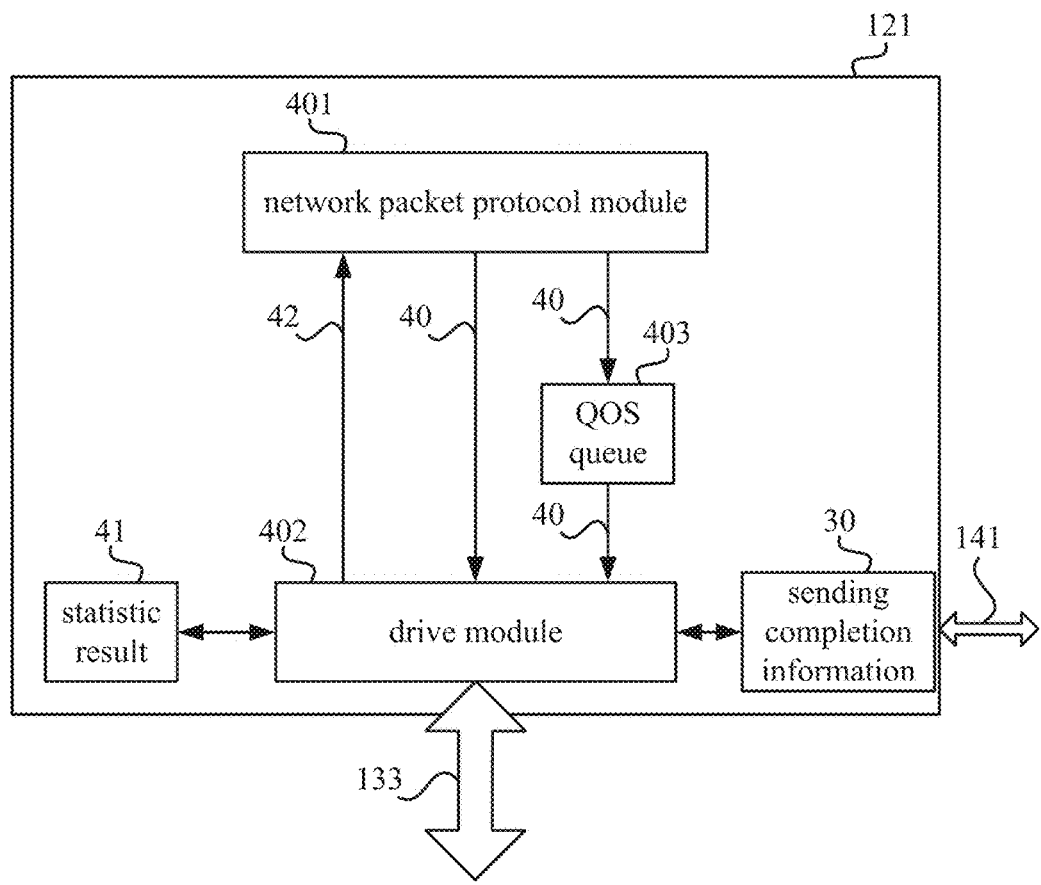
FIG. 7 is a diagram illustrating a CPU according to various examples of the present disclosure.

FIG. 7 is a diagram illustrating a CPU according to various examples of the present disclosure. Referring to FIGS. 1 and 7, the CPU 121 may include a network packet protocol module 401, a drive module 402, and a QOS queue 403 located between the network packet protocol module 401 and the drive module 402.

The network packet protocol module 401 may process Ethernet data packets 40 and determine whether the Ethernet data packets 40 congest in the egress direction.

The drive module 402 may transmit the Ethernet packets 40 via the Ethernet data channel in the ingress and egress direction, read the flow control message 32 in the memory 123, maintain a statistic result 41 of the Ethernet data packets 40 transmitted via the Ethernet data channel, i.e. the Ethernet bus 133 in the egress direction, maintain a queue state 42 of the sending buffering queue 21 in the interface board 11, and send the queue state 42 to the network packet protocol module 401. When there are multiple interface boards and multiple logic channels, the drive module 402 may maintain the queue state 42 of the sending buffering queue 21 according to the flow control message 32 read from the sending completion queue corresponding to the buffering queue 21 in the memory 123.

In the egress direction, after the Ethernet data packet 40 is transmitted to the Ethernet data channel, i.e. the Ethernet bus 133, the drive module 402 may increase the statistic result 41 of the Ethernet data packets 40 transmitted via the Ethernet data channel in the egress direction. When the statistic result 41 reaches a buffering upper limit of the sending buffering queue 21, the drive module 402 may configure the queue stat 42 as full.

The drive module 402 may decrease the statistic result 41 of the Ethernet data packets 40 transmitted via the Ethernet data channel in the egress direction according to the number of sent out Ethernet data packets 40 indicated by the sending completion information 30 in the flow control message 32. When the statistic result 41 is lower than the buffering upper limit of the sending buffering queue 21, the drive module 402 may configure the queue state 42 as non-full.

If the queue state 42 reported by the drive module 402 to the network packet protocol module 401 is non-full, the network packet protocol module 401 may transmit the Ethernet data packet 40 in the egress direction to the drive module 402, the Ethernet data packet 40 buffered in the QOS queue 403 may have priority, and the drive module 402 may transmit the received Ethernet data packet 40 to the Ethernet data channel, i.e. the Ethernet bus 133. If the queue state 42 reported by the drive module 402 to the network packet protocol module 401 is full, the network packet protocol module 401 may transmit the Ethernet data packet 40 in the egress direction to the QOS queue 403 to be buffered until the queue state 42 reported by the drive module 402 is non-full.

According to the examples of the present disclosure, the first logic apparatus 112 of the interface board 11 may report the sending completion information 30 of the Ethernet data packets in the egress direction by sending the Ethernet flow control packet 31 carrying the sending completion information 30. The Ethernet flow control packet 31 may be transmitted to the second logic apparatus 124 of the mainboard 12 via the Ethernet switch chip 122 of the mainboard 12. The second logic apparatus 124 may obtain the sending completion message 30 by parsing the Ethernet flow control packet 31, add the sending completion message 30 into the flow control message 32, and write the flow control message 32 into the memory 123 of the mainboard 12. The CPU 121 of the mainboard 12 may read the sending completion message 30 in real time, and determine whether the Ethernet data packets in the egress direction congest, thereby facilitating accurately implementation of the QOS in the egress direction for the network device.

In addition, the transmission of the sending completion message 30 does not occupies the Ethernet data channel 133 between the CPU 121 and the Ethernet switch chip 122, and thus does not affect the transmission of the Ethernet data packets. Moreover, for the CPU 121, the processing of the sending completion message 30 of the Ethernet data packets in the egress direction is separate from the processing of the Ethernet data packets in the ingress direction, thereby implementing loose coupling between sending and receiving the Ethernet data packets.

The examples of the present disclosure also provide a flow control method and apparatus of a network device.

Figure 8:
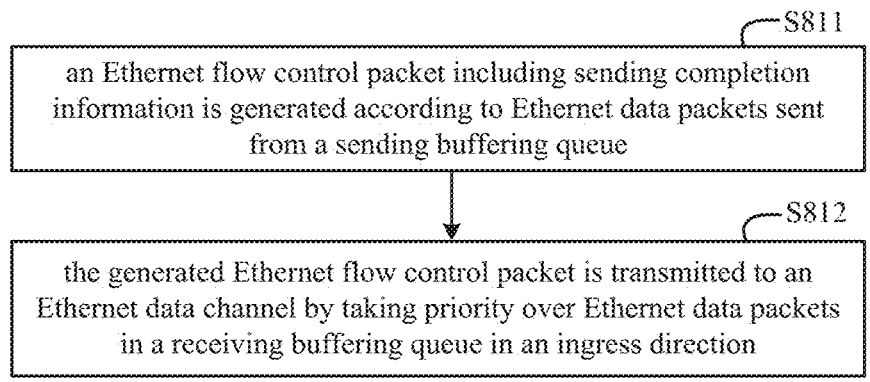
FIG. 8 is a flowchart illustrating a flow control method of a network device according to various examples of the present disclosure.

FIG. 8 is a flowchart illustrating a flow control method of a network device according to various examples of the present disclosure. The flow control method of the network device may be applied by a logic apparatus of an interface board in the network device, e.g. the first logic apparatus 112 shown in FIG. 1. As shown in FIG. 8, the method includes the following blocks.

At block S811, an Ethernet flow control packet including sending completion information is generated according to Ethernet data packets sent from a sending buffering queue.

At block S812, the generated Ethernet flow control packet is transmitted to an Ethernet data channel by taking priority over Ethernet data packets in a receiving buffering queue in an ingress direction.

In some examples, at block S811, the generated Ethernet flow control packet may be further configured with a priority higher than a priority of the Ethernet data packets. When there are multiple interface boards and multiple logic channels are generated by the interface boards, interface board identifiers and logic channel identifiers corresponding to sent out Ethernet data packets in an egress direction may be added into the Ethernet flow control packet at block S811.

Figure 9:
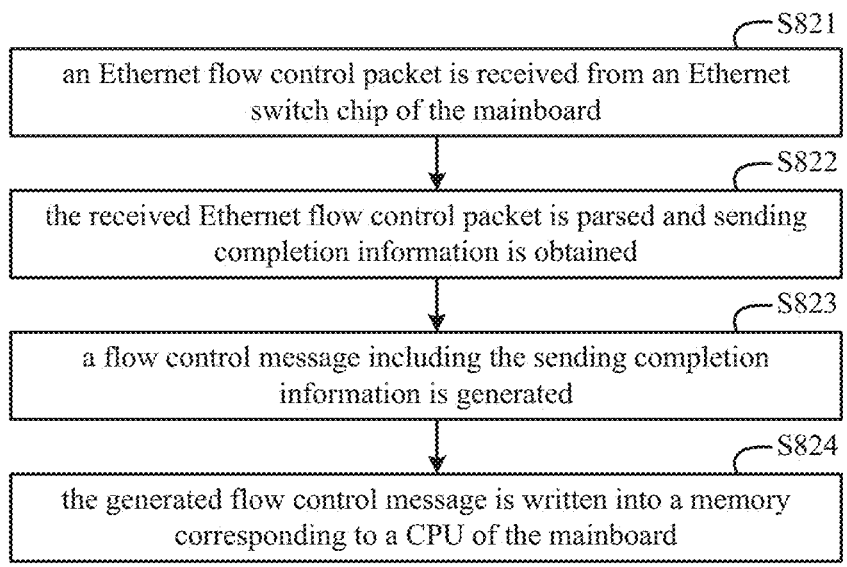
FIG. 9 is a flowchart illustrating a flow control method of a network device according to various examples of the present disclosure.

FIG. 9 is a flowchart illustrating a flow control method of a network device according to various examples of the present disclosure. The flow control method of the network device may be applied by a logic apparatus of a mainboard in the network device, e.g. the second logic apparatus 124 shown in FIG. 1. As shown in FIG. 9, the method includes the following blocks.

At block S821, an Ethernet flow control packet is received from an Ethernet switch chip of the mainboard.

At block S822, the received Ethernet flow control packet is parsed and sending completion information is obtained.

At block S823, a flow control message including the sending completion information is generated.

At block S824, the generated flow control message is written into a memory corresponding to a CPU of the mainboard.

In some examples, at block S824, the generated flow control message may be written into the memory by using a DMA mode. In some examples, at block S824, the CPU may be notified to read the flow control message from the memory by using an interrupt mode. When there are multiple interface boards and multiple logic channels are generated by the interface boards, at block S822, an interface board identifier and a logic channel identifier may be obtain by parsing the Ethernet flow control packet, and at block S824, the flow control message may be written into a sending completion queue in the memory according to the obtained interface board identifier and the logic channel identifier.

Figure 10:
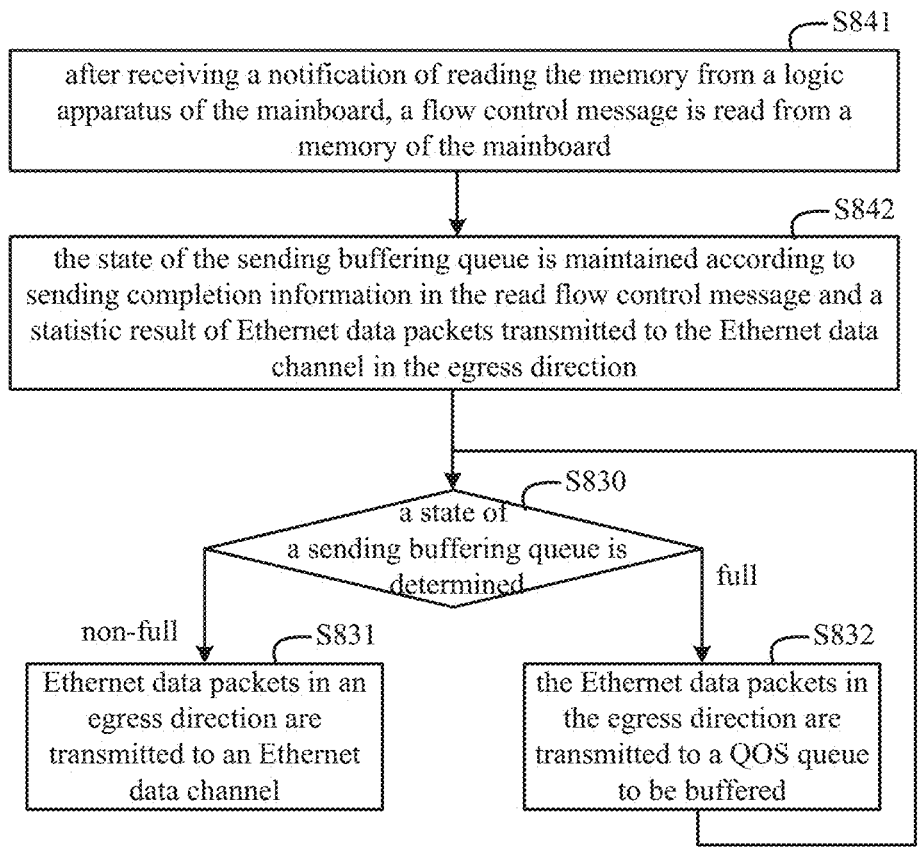
FIG. 10 is a flowchart illustrating a flow control method of a network device according to various examples of the present disclosure.

FIG. 10 is a flowchart illustrating a flow control method of a network device according to various examples of the present disclosure. The flow control method of the network device may be applied by a CPU of a mainboard in the network device, e.g. the CPU 121 shown in FIG. 1. As shown in FIG. 10, the method includes the following blocks.

At block S830, a state of a sending buffering queue maintained in an interface board of the network device is determined.

At block S831, when the state of the sending buffering queue is non-full, Ethernet data packets in an egress direction are transmitted to an Ethernet data channel.

At block S832, when the state of the sending buffering queue is full, the Ethernet data packets in the egress direction are transmitted to a QOS queue to be buffered until the state of the sending buffering queue is non-full.

At block S841, after receiving a notification of reading the memory from a logic apparatus of the mainboard, a flow control message is read from a memory of the mainboard.

At block S842, the state of the sending buffering queue is maintained according to sending completion information in the read flow control message and a statistic result of Ethernet data packets transmitted to the Ethernet data channel in the egress direction.

In some examples, at block S841, the flow control message may be read from the memory of the mainboard by using a polling mode or an interrupt response mode. When there are multiple interface boards and multiple logic channels are generated by the interface boards, the flow control message may be read from a sending completion queue corresponding to the interface board and the logic channel at block S841, and the read flow control message may be used for maintaining the state of the sending buffering queue corresponding to the interface board and the logic channel at block S842.

Figure 11:
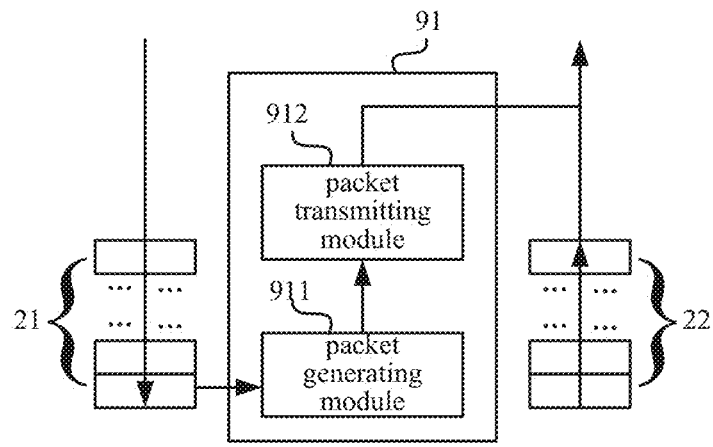
FIG. 11 is a diagram illustrating a flow control apparatus of a network device according to various examples of the present disclosure.

FIG. 11 is a diagram illustrating a flow control apparatus of a network device according to various examples of the present disclosure. The flow control apparatus 91 may be applied in a logic apparatus of an interface board in the network device, e.g. the first logic apparatus 112 shown in FIG. 1. As shown in FIG. 11, the flow control apparatus 91 includes a packet generating module 911 and a packet transmitting module 912.

The packet generating module 911 is to generate an Ethernet flow control packet including sending completion information according to Ethernet data packets sent from a sending buffering queue 21.

The packet transmitting module 912 is to transmit the generated Ethernet flow control packet to an Ethernet data channel by taking priority over Ethernet data packets in a receiving buffering queue 22 in an ingress direction.

The packet generating module 911 is further to configure a priority higher than a priority of the Ethernet data packets for the generated Ethernet flow control packet. When there are multiple interface boards and multiple logic channels are generated by the multiple interface boards, the packet generating module 911 is further to add an interface board identifier and a logic channel identifier corresponding to the sent out Ethernet data packet in the egress direction into the Ethernet flow control packet.

Figure 12:
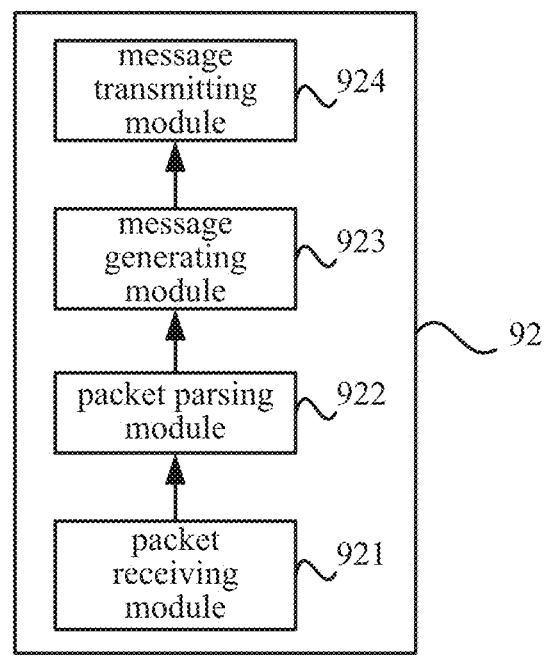
FIG. 12 is a diagram illustrating a flow control apparatus of a network device according to various examples of the present disclosure.

FIG. 12 is a diagram illustrating a flow control apparatus of a network device according to various examples of the present disclosure. The flow control apparatus 92 may be applied in a logic apparatus of a mainboard in a network device, e.g. the second logic apparatus 124 shown in FIG. 1. As shown in FIG. 12, the apparatus includes a packet receiving module 921, a packet parsing module 922, a message generating module 923 and a message transmitting module 924. The packet receiving module 921 is to receive an Ethernet flow control packet from an Ethernet switch chip of the mainboard.

The packet parsing module 922 is to parse the received Ethernet flow control packet and obtain sending completion information.

The message generating module 923 is to generate a flow control message including the sending completion information.

The message transmitting module 924 is to write the generated flow control message into a memory corresponding to a CPU of the mainboard.

The message transmitting module 924 may write the flow control message into the memory by using a DMA mode.

In some examples, the message transmitting module 924 may notify the CPU to read the flow control message from the memory by using an interrupt mode. When there are multiple interface boards and multiple logic channels are generated by the interface boards, the packet parsing module 922 may further obtain an interface board identifier and a logic channel identifier by parsing the Ethernet flow control packet, and the message transmitting module 924 may write the flow control message into a sending completion queue in the memory according to the obtained interface board identifier and the logic channel identifier.

Figure 13:
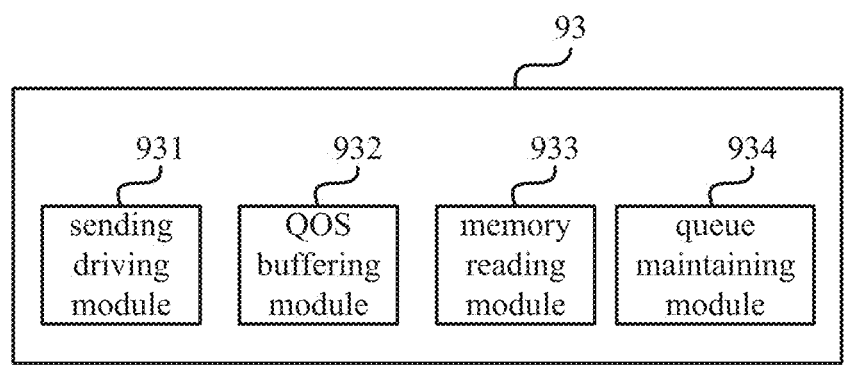
FIG. 13 is a diagram illustrating a flow control apparatus of a network device according to various examples of the present disclosure.

FIG. 13 is a diagram illustrating a flow control apparatus of a network device according to various examples of the present disclosure. As shown in FIG. 13, The apparatus 93 includes a sending driving module 931, a QOS buffering module 932, a memory reading module 933 and a queue maintaining module 924.

The sending driving module 931 is to transmit Ethernet data packets in an egress direction to an Ethernet data channel, when a state of the sending buffering queue maintained in an interface board of the network device is non-full.

The QOS buffering module 932 is to, when the state of the sending buffering queue is full, transmit the Ethernet data packets in the egress direction to a QOS queue to be buffered until the state of the sending buffering queue is non-full.

The memory reading module 933 is to read a flow control message from a memory of the mainboard, after a notification of reading the memory is received from a logic apparatus of the mainboard.

The queue maintaining module 934 is to maintain the state of the sending buffering queue according to sending completion information in the read flow control message and a statistic result of Ethernet data packets transmitted to the Ethernet data channel in the egress direction.

In some examples, the memory reading module 933 may read the flow control message from the memory of the mainboard by using a polling mode or a interrupt response mode. When there are multiple interface boards and multiple logic channels are generated by the interface boards, the memory reading module 933 may read the flow control message read from a sending completion queue corresponding to the interface board and the logic channel, and the read flow control message may be used by the queue maintaining module 934 to maintain the state of the sending buffering queue corresponding to the interface board and the logic channel.

Figure 14:
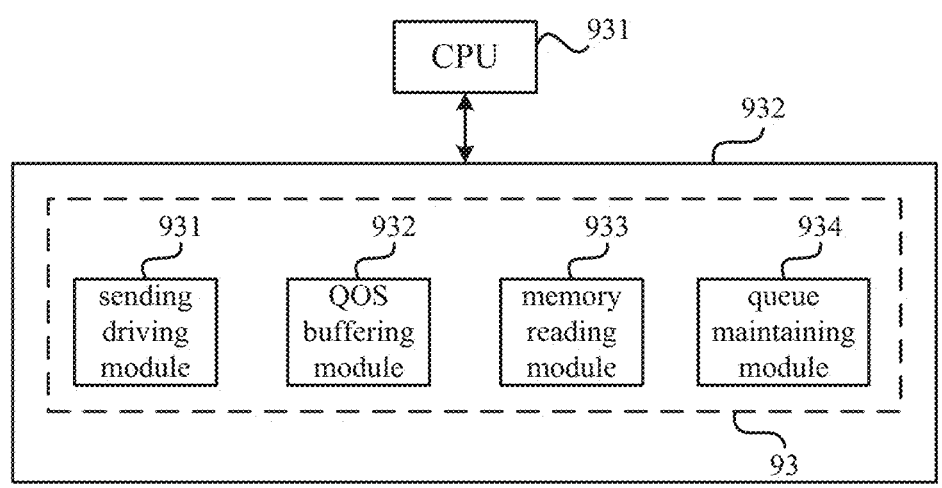
FIG. 14 is a diagram illustrating a flow control apparatus of a network device according to an example of the present disclosure.

In some examples, the flow control apparatus 93 shown in FIG. 13 may be implemented by combining software and hardware. As shown in FIG. 14, in a hardware structure including a CPU 931 and a memory 932, the CPU 931 may be similar with the CPU 121 shown in FIG. 1 and the memory 932 may be similar with the memory 123 shown in FIG. 1 or may be other memory, the flow control apparatus 93 may be computer instructions stored in the memory 932, and the computer instructions may be executed by the CPU 931 to implement the functions of the modules shown in FIG. 13.

When the state of the sending buffering queue maintained in the interface board of the network device is non-full, the CPU 931 transmits the Ethernet data packets in the egress direction to the Ethernet data channel.

When the state of the sending buffering queue is full, the CPU 931 transmits the Ethernet data packets in the egress direction to the QOS queue to be buffered until the state of the sending buffering queue is non-full.

After receiving the notification of reading the memory from the logic apparatus of the mainboard, the CPU 931 reads the flow control message from the memory, e.g. the memory 123 shown in FIG. 1.

The CPU 931 maintains the state of the sending buffering queue according to the sending completion information in the read flow control message and the statistic result the of Ethernet data packets transmitted to the Ethernet data channel in the egress direction.

According to the examples of the present disclosure, the first logic apparatus of the interface board may report the sending completion information of the Ethernet data packets in the egress direction by sending the Ethernet flow control packet carrying the sending completion information. The Ethernet flow control packet may be transmitted to the second logic apparatus of the mainboard via the Ethernet switch chip of the mainboard. The second logic apparatus may obtain the sending completion message by parsing the Ethernet flow control packet, add the sending completion message into the flow control message, and write the flow control message into the memory of the mainboard. The CPU of the mainboard may read the sending completion message in real time, and determine whether the Ethernet data packets in the egress direction congest, thereby facilitating accurate implementation of the QOS in the egress direction for the network device.

In addition, the transmission of the sending completion message does not occupy the Ethernet data channel between the CPU and the Ethernet switch chip, and thus does not affect the transmission of the Ethernet data packets. Moreover, for the CPU, the processing of the sending completion message of the Ethernet data packets in the egress direction is separate from the processing of the Ethernet data packets in the ingress direction, thereby implementing loose coupling between sending and receiving the Ethernet data packets.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

The invention claimed is:

1. A flow control method of a network device, comprising:
generating, by a logic apparatus of an interface board in the network device, an Ethernet flow control packet including sending completion information according to Ethernet data packets sent from a sending buffering queue maintained in the interface board;
transmitting, by the logic apparatus of the interface board, the Ethernet flow control packet including sending completion information to an Ethernet data channel by taking priority over Ethernet data packets in a receiving buffering queue in an ingress direction; the sending completion information being used by a Central Processing Unit (CPU) of a mainboard to maintain a state of the sending buffering queue.

2. The method of claim 1, further comprising:
when the state of the sending buffering queue is non-full, transmitting, by the CPU of the mainboard, Ethernet data packets in an egress direction to the Ethernet data channel;

when the state of the sending buffering queue is full, transmitting, by the CPU of the mainboard, the Ethernet data packets in the egress direction to a Quality of Service (QOS) queue to be buffered until the state of the sending buffering queue is non-full;

reading, by the CPU of the mainboard, a flow control message from a memory of the mainboard after receiving a notification of reading the memory from a logic apparatus of the mainboard; and maintaining, by the CPU of the mainboard, the state of the sending buffering queue according to the sending completion information in the read flow control message and a statistic result of Ethernet data packets transmitted to the Ethernet data channel in the egress direction.

3. The method of claim 2, further comprising:

receiving, by the logic apparatus of the mainboard, the Ethernet flow control packet from an Ethernet switch chip of the mainboard;

obtaining, by the logic apparatus of the mainboard, the sending completion information by parsing the received Ethernet flow control packet;

generating, by the logic apparatus of the mainboard, a flow control message including the sending completion information;

writing, by the logic apparatus of the mainboard, the flow control message into a memory corresponding to the CPU of the mainboard.

4. The method of claim 3, wherein the generated flow control message is written into the memory by using a Direct Memory Access (DMA) mode.

5. The method of claim 3, further comprising:

adding into the Ethernet flow control packet, by the logic apparatus of the interface board, an interface board identifier and a logic channel identifier corresponding to a sent out Ethernet data packet in an egress direction;

writing, by the logic apparatus of the mainboard, the flow control message into a sending completion queue in the memory according to the interface board identifier and the logic channel identifier obtained from the Ethernet flow control packet.

6. The method of claim 3, further comprising:

maintaining, by the CPU of the mainboard, the state of the sending buffering queue according to the flow control message read from a sending completion queue in the memory.

7. The method of claim 2, wherein the flow control message is read by the CPU of the mainboard from the memory of the mainboard by using a polling mode.

8. The method of claim 2, further comprising:

notifying, by the logic apparatus of the mainboard, the CPU of the mainboard to read the flow control message from the memory by using an interrupt mode;

wherein the flow control message is read by the CPU of the mainboard from the memory of the mainboard by using an interrupt response mode.

9. The method of claim 1, wherein the sending completion information comprises a number of ethernet data packets sent out since sending of a prior ethernet flow control packet.

10. The method of claim 1 further comprising sending, by an ethernet switch chip, the ethernet flow control packet towards the CPU of the mainboard using a first ethernet bus and sending, by the ethernet switch chip, one of the ethernet data packets towards the CPU of the mainboard using a second ethernet bus different than the first ethernet bus.

11. A network device, comprising:
an interface board; and
a mainboard;
the interface board comprising a first logic apparatus,
the mainboard comprising a Central Processing Unit (CPU), and an Ethernet switch chip;
wherein:
an Ethernet data channel is formed between the first logic apparatus and the CPU via the Ethernet switch chip;
the first logic apparatus maintains a sending buffering queue and a receiving buffering queue; and
the first logic apparatus is to:
generate an Ethernet flow control packet including sending completion information according to Ethernet data packets sent from the sending buffering queue; and
transmit the Ethernet flow control packet including the sending completion information to the Ethernet data channel in an ingress direction by taking priority over Ethernet data packets in the receiving buffering queue, the sending completion information to be used by the CPU to maintain the state of the sending buffering queue.

12. The network device of claim 11, wherein the mainboard further comprises a memory and a second logic apparatus;
wherein the CPU is to:
when a state of the sending buffering queue is non-full, transmit Ethernet data packets in an egress direction to the Ethernet data channel;
when the state of the sending buffering queue is full, transmit the Ethernet data packets in the egress direction to a Quality of Service (QOS) queue to be buffered until the state of the sending buffering queue is non-full; and
read a flow control message from the memory after receiving a notification of reading the memory from the second logic apparatus; and maintain the state of the sending buffering queue according to sending completion information in the flow control message and a statistic result of Ethernet data packets transmitted to the Ethernet data channel in the egress direction.

13. The network device of claim 12, wherein
the second logic apparatus is to receive the Ethernet flow control packet from the Ethernet switching chip, obtain the sending completion information by parsing the Ethernet flow control packet, generate the flow control message including the sending completion information, and write the flow control message into the memory.

14. The network device of claim 13, wherein the second logic apparatus is to write the flow control message into the memory by using a Direct Memory Access (DMA) mode.

15. The network device of claim 13, wherein:
the first logic apparatus is further to add an interface board identifier and a logic channel identifier corresponding to a sent out Ethernet data packet in the egress direction into the Ethernet flow control packet;
the second logic apparatus is further to write the flow control message into a sending completion queue in the memory according to the interface board identifier and the logic channel identifier; and
the CPU is to maintain the state of the sending buffering queue according to the flow control message read from the sending completion queue in the memory.

16. The network device of claim 12, wherein the CPU is to read the flow control message from the memory by using a polling mode.

17. The network device of claim 12, wherein the second logic apparatus is further to notify the CPU to read the flow control message from the memory by using an interrupt mode, and the CPU is to read the flow control message from the memory by using an interrupt response mode.

18. The network device of claim 11, wherein the sending completion information comprises a number of ethernet data packets sent out since sending of a prior ethernet flow control packet.

19. The network device of claim 11 further comprising:
a first ethernet bus between the ethernet switch chip and the CPU; and
a second ethernet bus extending from the ethernet switch chip, wherein the ethernet switch chip is to transmit the ethernet data packets using the first ethernet bus and is to transmit the ethernet flow control packet using the second ethernet bus.

20. The network device of claim 19 further comprising a second logic apparatus, wherein the second ethernet bus connects the ethernet switch chip to the second logic apparatus and wherein the second logic apparatus is to parse the ethernet flow control packet, generate a flow control message including the sending completion information and write the flow control message into a memory.

* * * * *